(12) United States Patent
Moriyama et al.

(10) Patent No.: US 7,793,283 B2
(45) Date of Patent: Sep. 7, 2010

(54) COMMUNICATION TERMINAL SOFTWARE UPDATING METHOD, COMMUNICATION TERMINAL, AND SOFTWARE UPDATING METHOD

(75) Inventors: Koichi Moriyama, Tokyo (JP); Takashi Kadohiro, Kanagawa (JP); Tadao Takami, Kanagawa (JP); Seiji Hoshi, Kanagawa (JP)

(73) Assignee: NTT DoCoMo, Inc., Tokyo (JP)

( * ) Notice: Subject to any disclaimer, the term of this patent is extended or adjusted under 35 U.S.C. 154(b) by 1151 days.

(21) Appl. No.: 10/509,734

(22) PCT Filed: Apr. 1, 2003

(86) PCT No.: PCT/JP03/04187

§ 371 (c)(1),
(2), (4) Date: Mar. 25, 2005

(87) PCT Pub. No.: WO03/083647

PCT Pub. Date: Oct. 9, 2003

(65) Prior Publication Data

US 2005/0210458 A1   Sep. 22, 2005

(30) Foreign Application Priority Data

Apr. 1, 2002  (JP) .............................. 2002-099102

(51) Int. Cl.
G06F 9/44    (2006.01)
(52) U.S. Cl. ...................................... 717/173; 717/178
(58) Field of Classification Search ........................ None
See application file for complete search history.

(56) References Cited

U.S. PATENT DOCUMENTS

| | | | | |
|---|---|---|---|---|
| 6,343,379 | B1* | 1/2002 | Ozawa et al. | 725/63 |
| 6,381,741 | B1* | 4/2002 | Shaw | 717/168 |
| 6,615,404 | B1* | 9/2003 | Garfunkel et al. | 717/173 |
| 6,640,334 | B1* | 10/2003 | Rasmussen | 717/171 |
| 6,687,901 | B1* | 2/2004 | Imamatsu | 717/173 |
| 6,959,436 | B2* | 10/2005 | Peng | 719/310 |
| 7,007,049 | B2* | 2/2006 | Peng | 707/205 |
| 7,100,011 | B2* | 8/2006 | Winters et al. | 711/165 |
| 7,159,214 | B2* | 1/2007 | Rajaram et al. | 717/172 |

FOREIGN PATENT DOCUMENTS

| | | | |
|---|---|---|---|
| EP | 0 654 936 A2 | 5/1995 | |
| EP | 0 950 948 A2 | 10/1999 | |

(Continued)

*Primary Examiner*—Michael J Yidgall
(74) *Attorney, Agent, or Firm*—Oblon, Spivak, McClelland, Maier & Neustadt, L.L.P.

(57) ABSTRACT

The method of the present invention is an update method of a software which is stored in a rewritable non-volatile memory of a communication terminal and is directly executed. The method comprises: an update file transfer step in which an update software is transferred to the communication terminal from a software management server for managing the update software which is to be stored in the rewritable non-volatile memory as an update file, and the update file is stored in a rewritable volatile memory of the communication terminal; and an update software rewriting step in which the software, which is stored in the rewritable non-volatile memory and is directly executed, is rewritten with the update software stored in the rewritable volatile memory as the update file after the update file transfer step.

12 Claims, 4 Drawing Sheets

FOREIGN PATENT DOCUMENTS

| | | |
|---|---|---|
| EP | 1 164 476 A2 | 12/2001 |
| JP | 04-084319 | 3/1992 |
| JP | 10-105407 | 4/1998 |
| JP | 11-296364 | 10/1999 |
| JP | 2000-010787 | 1/2000 |
| JP | 2000-047877 | 2/2000 |
| JP | 2001-067228 | 3/2001 |
| JP | 2002-7152 | 1/2002 |
| JP | 2002-132527 | 5/2002 |

* cited by examiner

*Fig.3*

| TERMINAL ID | VERSION INFORMATION | UPDATE SOFTWARE | FILE CAPACITY |
|---|---|---|---|
| 0001 | 1 | A | 200 |
|  | 2 | B | 150 |
| 0002 | 1 | C | 120 |
|  | 2 | D | 180 |
| ⋮ | ⋮ | ⋮ | ⋮ |

COMMUNICATION TERMINAL SOFTWARE UPDATING METHOD, COMMUNICATION TERMINAL, AND SOFTWARE UPDATING METHOD

TECHNICAL FIELD

The present invention relates to a software update method for updating software of a communication terminal, a communication terminal and a software update system.

BACKGROUND ART

The Operating System (OS) for controlling a communication terminal and such basic software as middleware are normally stored in a non-volatile memory installed on the communication terminal, and is directly executed on the non-volatile memory so as not to be lost when power is turned OFF, in order that operation is possible by turning the power ON again even if power of the communication terminal is shut OFF.

For non-volatile memory, normally a rewritable non-volatile memory, such as a flash ROM (Read Only Memory) is used to avoid an exchange of the non-volatile memory itself when the basic software is upgraded, and the version upgrade is executed by rewriting the software.

Along with the recent advancements in communication means, a method of upgrading software, which is stored in the above mentioned rewritable non-volatile memory and is directly executed, by downloading the update software, from a software management server which manages update software has been proposed. This software update method rewrites the software, which is stored in the rewritable non-volatile memory and is directly executed, at the same time with downloading the update software. Therefore, if rewriting software stops mid-way by an interruption in the download of the update software due to such a cause as a power failure, it may become impossible to use the communication terminal. To prevent this risk, a conventional communication terminal has dual rewritable non-volatile memories. And to update the software, the currently operating software remains in one of the duel rewritable non-volatile memories, and in this status the update software is transferred to the other rewritable non-volatile memory from the software management server. Then after transfer of the update software completes, operation is switched from the rewritable non-volatile memory, where currently operating software is stored, to the rewritable non-volatile memory where the update software is stored. Therefore even if an update of software fails, as mentioned above, the currently operating software operates, so the risk of the communication terminal becoming disabled can be prevented.

DISCLOSURE OF THE INVENTION

However in the conventional software update method, the rewritable non-volatile memory of the communication terminal must be duplicated to prevent risk due to the failure of software update, as mentioned above. As a result, the communication terminal has a problem that the size thereof becomes large and the cost thereof increases. With the foregoing in view, it is an object of the present invention to provide an update method of software, a communication terminal and a software update system for solving the above mentioned problems of size increase and cost increase of the communication terminal.

To solve the above problems, a communication terminal of the present invention comprises a rewritable non-volatile memory and a rewritable volatile memory. The communication terminal further comprises: transfer status transition means for limiting operation of software which uses the rewritable volatile memory and securing an area required for storing an update file in the rewritable volatile memory before receiving update software as the update file from a software management server which manages the update software; transfer request transmission means for requesting transfer of the update file to the software management server after the transfer status transition means secures the area required for storing the update file in the rewritable volatile memory; update file reception means for receiving the update file from the software management server, and storing the update file in the rewritable volatile memory; and software rewriting means for rewriting software, which is stored in the rewritable non-volatile memory and is directly executed, with the update software stored in the rewritable volatile memory as the update file, after completion of storing the update file to the rewritable volatile memory by the update file reception means.

An update method of software of a communication terminal according to the present invention is an update method of software, which is stored in a rewritable non-volatile memory of a communication terminal having the rewritable non-volatile memory and a rewritable volatile memory, and is directly executed. The method comprises: a transfer status transition step in which transfer status transition means of the communication terminal limits operation of software which uses the rewritable volatile memory and secures an area required for storing an update file in the rewritable volatile memory before receiving update software as the update file from a software management server which manages the update software; a transfer request transmission step in which transfer request transmission means of the communication terminal requests transfer of the update file to the software management server after the area required for storing the update file is secured in the rewritable volatile memory; an update file transfer step in which the software management server transmits the update file to the communication terminal on the basis of a request of the transfer of the update file by the communication terminal, update file reception means of the communication terminal receives the update file transmitted from the software management server, and the update file reception means stores the update file in the area secured by the transfer status transition means; and a software rewriting step in which software rewriting means of the communication terminal rewrites software, which is stored in the rewritable non-volatile memory and is directly executed, with the update software stored in the rewritable volatile memory as the update file, after the update file transfer step.

A software update system of the present invention comprises a communication terminal having a rewritable non-volatile memory and a rewritable volatile memory, and a software management server. The communication terminal comprises: transfer status transition means for limiting operation of software which uses the rewritable volatile memory and securing an area required for storing an update file in the rewritable volatile memory before receiving update software as the update file from the software management server which manages the update software; transfer request transmission means for requesting transfer of the update file to the software management server after the transfer status transition means secures the area required for storing the update file in the rewritable volatile memory; update file reception means for receiving the update file from the software management server, and storing the update file in the rewritable volatile memory; and software rewriting means for rewriting software, which is stored in the rewritable non-volatile memory and is directly executed, with the update software stored in the rewritable volatile memory as the update file, after completion of storing the update file to the rewritable volatile memory by the update file reception means. The software management server comprises update file transmission means for transmitting the update software of the software, which is stored in the rewritable non-volatile memory provided in the communication terminal and is directly executed, as the update file to the communication terminal on the basis of a request of the transfer of the update file by the communication terminal.

According to the present invention, the operation of the software, which uses the rewritable volatile memory in the normal status of the communication terminal, is limited before transmitting the update file, the area required for storing the update file is thus secured in the rewritable volatile memory, and then the update file is transferred. Therefore, if the capacity of the rewritable volatile memory is small, it is possible to transfer the update file to the rewritable volatile memory without increasing a memory. In addition, after transferring the update file to the rewritable volatile memory, the software, which is stored in the rewritable non-volatile memory and is directly executed, is rewritten with the update software stored in the volatile memory as the update file. Therefore it is not necessary that the rewritable non-volatile memory is duplicated in order to update the software. As a result, the communication terminal can be downsized and cost can be decreased. Also transfer of the update file which tends to take time and to have such risk factors as power disconnection, and rewriting of software which takes a shorter time than above can be separated. As a consequence, time for rewriting the software can be decreased, and the risk of failing to update the software can be decreased. Also even if transfer is interrupted in the middle of transferring the update file, the software, which is stored in the rewritable non-volatile memory of the communication terminal and is directly executed, has not been rewritten, so operation of the communication terminal is not affected.

In the communication terminal of the present invention, the update file reception means stores the update file in the area of the rewritable volatile memory, which is secured by limiting the operation of the software which uses the rewritable volatile memory by the transfer status transition means.

In an update file receiving step, the update file reception means in the communication terminal of the present invention stores the update file in the area of the rewritable volatile memory, which is secured by limiting the operation of the software which uses the rewritable volatile memory by the transfer status transition means.

The communication terminal of the present invention may further comprise update file information reception means for receiving update file information including size information of the update file from the software management server, wherein the transfer status transition means secures the area for storing the update file in the rewritable volatile memory by limiting the operation of the software which uses the rewritable volatile memory on the basis of the size information included in the update file information.

The update method of the software in accordance with the present invention may further comprise: an update file information transmitting step in which the software management server transmits update file information including size information of the update file; and an update file information receiving step in which the communication terminal receives the update file information, wherein, in the transfer status transition step, the operation of the software which uses the rewritable volatile memory is limited on the basis of the size information included in the update file information, and the area for storing the update file is thus secured in the rewritable volatile memory.

According to the present invention, the communication terminal secures the area for storing the update file in the rewritable volatile memory on the basis of the size information of the update file included in the update file information. Therefore the area which has a suitable capacity for storing the update file can be secured in the rewritable volatile memory.

The communication terminal of the present invention may further comprise: communication terminal identification information storage means for storing identification information of the communication terminal; and communication terminal identification information transmission means for transmitting the identification information of the communication terminal, which is stored in the communication terminal identification information storage means, to the software management server.

The update method of software of the present invention may further comprise: a communication terminal identification information transmission step in which the communication terminal transmits the identification information of the communication terminal to the software management server; a communication terminal identification information reception step in which the software management server receives the identification information of the communication terminal which is transmitted by the communication terminal; and an update software selection step in which the software management server selects an update software to be stored in the rewritable non-volatile memory of the communication terminal, out of the update software owned by the software management server on the basis of the identification information of the communication terminal which is transmitted by the communication terminal, wherein the software management server transmits the selected update software to the communication terminals as the update file.

According to the present invention, the communication terminal transmits the identification information of the communication terminal to the software management server. Therefore the software management server can specify the model of the communication terminal. As a result, out of items of the update software owned by the software management server, update software to be stored in the rewritable non-volatile memory of the communication terminal can be accurately selected.

The communication terminal of the present invention may further comprise: software identification information storage means for storing identification information of the software which is stored in the rewritable non-volatile memory; and software identification information transmission means for transmitting the identification information of the software, which is stored in the software identification information storage means, to the software management server.

The update method of the software of the present invention may further comprise: a software identification information transmission step in which the communication terminal transmits the identification information of the software which is stored in the rewritable non-volatile memory and is directly executed to the software management server; a software identification information reception step in which the software management server receives the identification information of the software transmitted by the communication terminal; and an update software selection step in which the software management server selects update software to be stored in the rewritable non-volatile memory of the communication terminal, out of items of update software owned by the software management server on the basis of the identification information of the software which is transmitted by the communication terminal, wherein the software management server transmits the selected update software to the communication terminals as the update file.

According to the present invention, the communication terminal transmits the identification information of the software, which is stored in the rewritable non-volatile memory and is directly executed, to the software management server. Therefore the software management server can specify the version of the software which is currently operating in the rewritable non-volatile memory of the communication terminal on the basis of the identification information of the software. As a result, out of the items of update software owned by the software management server, the update software to be stored in the rewritable non-volatile memory of the communication terminal can be accurately selected.

In the communication terminal of the present invention, the update file reception means may receive a differential file, which is transmitted from the software management server on the basis of the identification information of the software, as the update file.

The update method of the software of the present invention may further comprise a differential file creation step in which the software management server produces a differential file between the software, which is stored in the rewritable non-volatile memory of the communication terminal and is directly executed, and items of update software owned by the software management server on the basis of the identification information of the software transmitted by the communication terminal, wherein the software management server transmits the differential file to the communication terminal as the update file.

In the software update system of the present invention, the communication terminal may further comprises: software identification information storage means for storing identification information of the software which is stored in the rewritable non-volatile memory; and software identification information transmission means for transmitting the identification information of the software which is stored in the software identification information storage means to the software management server, and the software management server may further comprise differential file creation means for producing a differential file of the update software of the software, which is stored in the rewritable non-volatile memory of the communication terminal and is directly executed, on the basis of the identification information of the software transmitted by the communication terminal, wherein the update file transmission means may transmit the differential file produced by the differential file creation means, and the update file reception means may receive the differential file transmitted by the software management server.

According to the update method of software of the present invention, the software management server produces the differential file between the software, which is stored in the rewritable non-volatile memory of the communication terminal and is directly executed, and the update software owned by the software management server, on the basis of the software identification information. Therefore by using the differential file as the update file, the size of the update file to be transmitted can be decreased. As a result, the update file can be accurately transmitted even via a narrowband communication line.

In the communication terminal of the present invention, the update file reception means may receive the update file by wireless communication.

In the update method for the software, the update file may be transmitted by wireless communication in a software transfer step.

Since the communication terminal of the present invention has the above-mentioned features, the update file can be efficiently transferred even via a narrowband communication line, such as a wireless communication line. Also even if it takes time to transfer the update file, this does not become a cause of failing to update software, therefore the risk of failing to update software, is low. As a consequence, the rewritable non-volatile memory of the communication terminal need not be duplicated for updating software.

The communication terminal of the present invention may further comprise: rewrite success judgment means for judging whether rewrite of the software executed by the software rewriting means succeeds or not; restoration status transition means for performing wire communication with a software restoration apparatus for restoring the software, which is stored in the rewritable non-volatile memory and is directly executed, by transferring the software to the rewritable non-volatile memory when the rewrite success judgment means judges that rewrite of the software executed by the software rewrite means fails; and restoration software reception means for receiving the software from the software restoration apparatus and storing the software in the rewritable non-volatile memory.

The update method of the software of the present invention may further comprise a restoration status transition step of performing wire communication with the software restoration apparatus for restoring the software, which is stored in the rewritable non-volatile memory and is directly executed, by transferring the software to the rewritable non-volatile memory, when the processing of rewriting the software, which is stored in the rewritable non-volatile memory and is directly executed, with the update software, which is stored in the rewritable volatile memory as an update file, fails in the software rewriting step.

The software update system of the present invention may further comprise a software restoration apparatus for connecting the communication terminal with wire communication and transferring software to the rewritable non-volatile memory of the communication terminal whereby restoring the software in the rewritable non-volatile memory, wherein the communication terminal further comprises: rewrite success judgment means for judging whether rewrite of the software executed by the software rewriting means succeeds or not; restoration status transition means for performing wire communication with the software restoration apparatus for restoring the software, which is stored in the rewritable non-volatile memory and is directly executed, by transferring the software to the rewritable non-volatile memory when the rewrite success judgment means judges that rewrite of the software executed by the software rewriting means fails; and restoration software reception means for receiving the software from the software restoration apparatus and storing the software in the rewritable non-volatile memory.

According to the present invention, even if the rewrite of software failed due to a power failure, for example, which occurs in the middle of the processing of rewriting the software, which is stored in the rewritable non-volatile memory and is directly executed, with the update software, wire communication with the software restoration apparatus becomes possible. The software restoration apparatus restores the software, which is stored in the rewritable non-volatile memory and is directly executed, by transferring the software to the rewritable non-volatile memory. Therefore if the communication terminal and the software restoration apparatus are connected, software can be restored in the rewritable non-volatile memory.

BRIEF DESCRIPTION OF THE DRAWINGS

FIG. 3 is a diagram depicting the storage format of the update file in the update software storage section of the software management server according to an embodiment of the present invention.

BEST MODES FOR CARRYING OUT THE INVENTION

Figure 1:
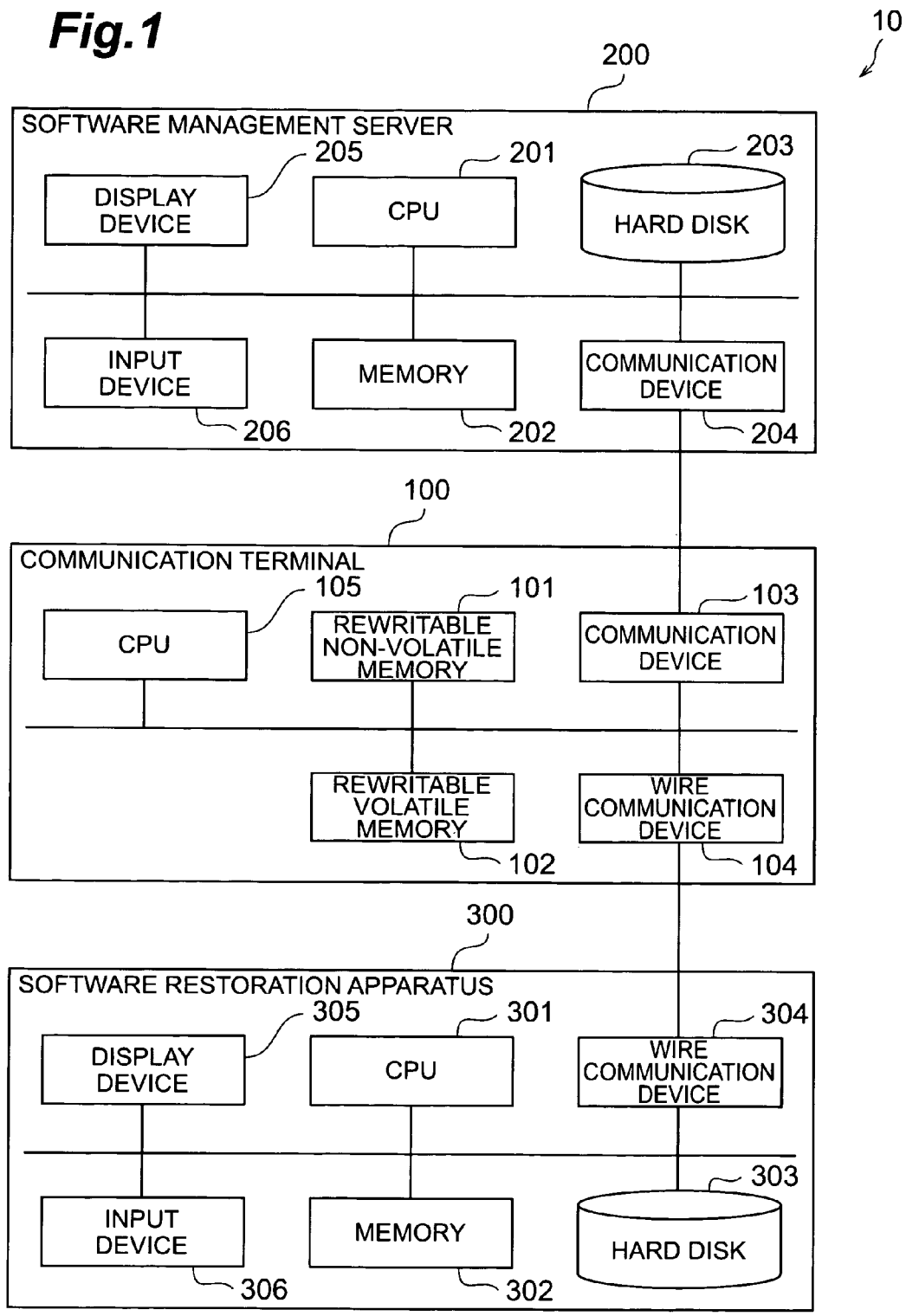
FIG. 1 is a system block diagram depicting the physical components of the software update system according to an embodiment of the present invention.
Figure 2:
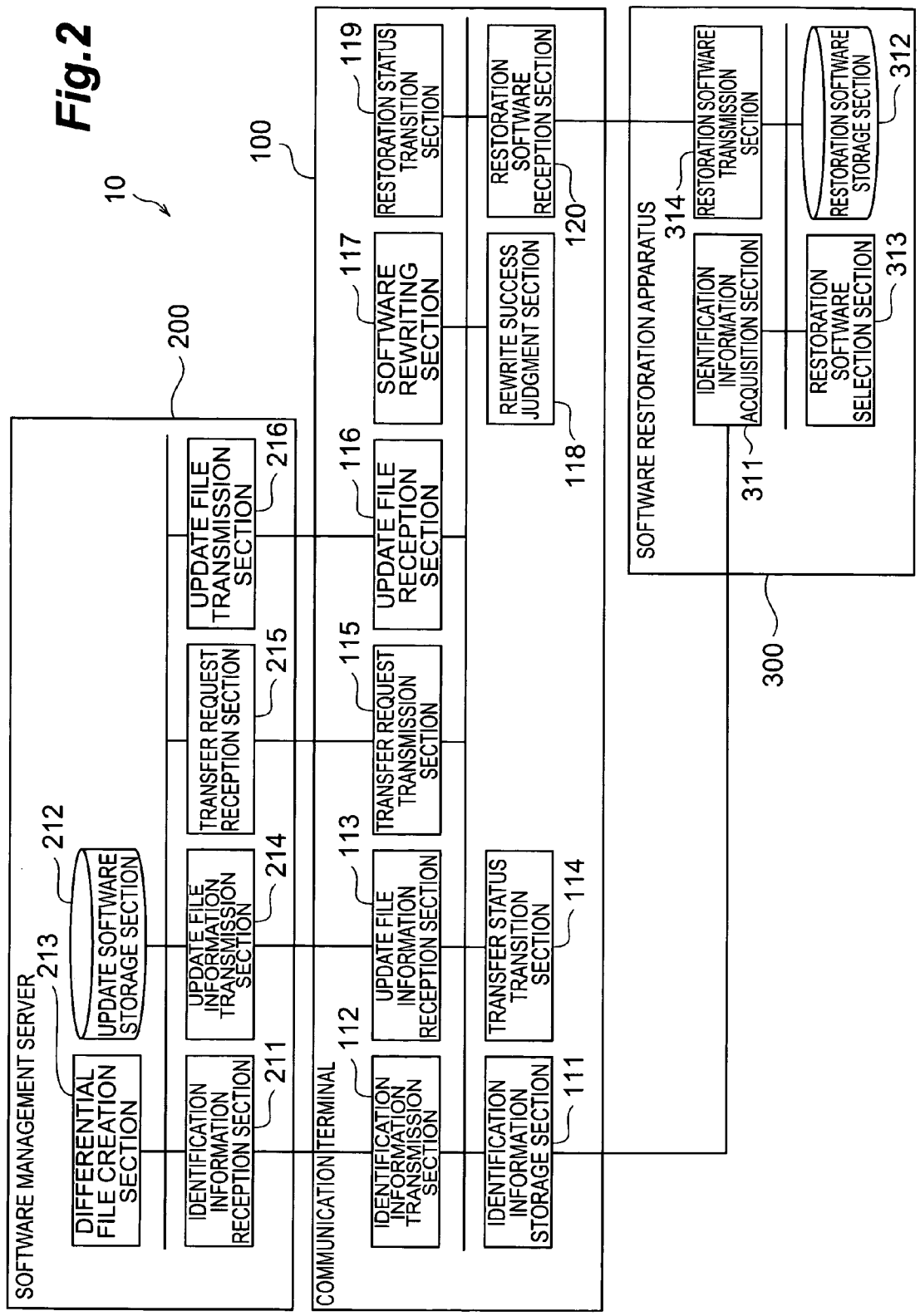
FIG. 2 is a system configuration diagram depicting the functional components of the software update system according to an embodiment of the present invention.

The software update system according to embodiments of the present invention will now be described with reference to the accompanying drawings. FIG. 1 is a system block diagram depicting the physical components of the software update system 10 according to the present embodiment. FIG. 2 is a system block diagram depicting the functional components of the software update system 10 according to the present embodiment. The software update system 10 according to the present embodiment comprises a communication terminal 100, software management server 200 and software restoration apparatus 300 as shown in FIG. 1 and FIG. 2. Hereinafter, the communication terminal 100, software management server 200 and software restoration apparatus 300 will be described in detail.

The communication terminal 100 physically comprises a rewritable non-volatile memory 101, rewritable volatile memory 102, communication device 103, wire communication device 104 and CPU (Central Processing Unit) 105. As the communication terminal 100 according to the present embodiment, a wide variety of mobile communication terminal can be used, including a portable telephone, a portable terminal such as a PDA (Personal Digital Assistant), and a communication terminal of a digital home electronic product which requires an update of software, which is stored in the rewritable non-volatile memory 101 and is directly executed, by downloading the update file using the communication device 103.

In the rewritable non-volatile memory 101, basic software for controlling the communication terminal 100, such as an OS, middleware, and communication software are stored. The rewritable non-volatile memory 101 is a non-volatile memory in which information stored therein can be rewritten like flash ROM, and information stored therein is not lost even if the power is shut OFF. The basic software stored in the rewritable non-volatile memory 101 is different from software which is stored in a hard disk of a personal computer and is read by other medium, such as memory, thereby being executed. The software stored in the rewritable non-volatile memory 101 is executed on the rewritable non-volatile memory 101 without being developed into another storage medium. In other words, the basic software and the like, stored in the rewritable non-volatile memory 101 is directly executed in the rewritable non-volatile memory 101.

The rewritable volatile memory 102 is a memory, for example RAM (Random Access Memory), which is used for storing data and software which do not affect operation of the communication terminal 100 even if stored information is erased by a power OFF or another reason.

The communication device 103 is a device for communicating with the software management server 200. The communication device 103 is used for transmitting identification information such as a terminal ID of the communication terminal 100 and the version information of the software, which is stored in the rewritable non-volatile memory 101 and is directly executed, of the communication terminal 100, to the software management server 200, and for receiving an update file from the software management server 200. The communication line to which the communication device 103 is connected may be either radio or such cable as a telephone line.

The wire communication device 104 is a device for connecting with the software restoration apparatus 300 via such a cable as serial cable, and is used for receiving software from the software restoration apparatus 300 when the wire communication device 104 connects to the software restoration apparatus 300, transfers the software to the rewritable non-volatile memory 101, and is restored by the software.

The CPU 105 is a central processing unit for controlling the communication terminal 100, and controls the communication terminal 100 according to the software stored in the rewritable non-volatile memory 101 and rewritable volatile memory 102.

The functional components of the communication 104 by the CPU 105 according to this software.

The identification information storage section 111 stores the identification information, such as the terminal ID of the communication terminal 100 and the version information of software which is stored in the rewritable non-volatile memory 101 and is directly executed. Specifically the identification information storage section 111 is implemented by storing the identification information in the rewritable non-volatile memory 101 of the communication terminal 100.

The identification information transmission section 112 acquires identification information, such as the terminal ID of the communication terminal 100 stored in the identification information storage section 111 and the version information of the software, which is stored in the rewritable non-volatile memory 101 and is directly executed, and transmits it to the software management server 200.

The update file information reception section 113 receives update file information, including information on the presence of an update file and the size information of the update file, which is transferred from the software management server 200, via the communication device 103 from the software management server 200.

The transfer status transition section 114 terminal 100 will be described below. As shown in FIG. 2, the communication terminal 100 comprises an identification information storage section 111 (communication terminal identification information storage means, software identification information storage means), an identification information transmission section 112 (communication terminal identification information transmission means, software identification information transmission means), an update file information reception section 113 (update file information reception means), a transfer status transition section 114 (transfer status transition means), a transfer request transmission section 115 (transfer request transmission means), an update file reception section 116 (update file reception means), a software rewriting section 117 (software rewriting means), a rewrite success judgment section 118 (rewrite success judgment means), a restoration status transition section 119 (restoration status transition means), and a restoration software reception section 120 (restoration software reception means), as the functional components. These components are implemented, for example, by storing software which controls software updating and data in the rewritable non-volatile memory 101, and controlling the communication device 103 and wire communication device acquires the size information of the update file, which is included in the update file information, if an update file exists, based on the update file information received by the update file information reception section 113. On the basis of the size information of the update file, the transfer status transition section 114 limits operation of software which uses the rewritable volatile memory 102, and secures an area required for transferring and storing the update file in the rewritable volatile memory 102 so as to enable transfer of the update file. The transfer status transition section 114 can limit the operation of the software or a part of the software, which uses the rewritable volatile memory 102, according to the size information of the update file.

The transfer request transmission section 115 transmits a request of transferring the update file to the software management server 200 via the communication device 103 after the area required for storing the update file is secured in the rewritable volatile memory 102 by the transfer status transition section 114.

The update file reception section 116 connects with the software management server 200 via the communication device 103 after the transfer request transmission section 115 transmits the above request to the software management server 200. The update file reception section 116 then receives the update file from the software management server 200 and stores it in the area of the rewritable volatile memory 102, which is secured by limiting the operation of the software using the rewritable volatile memory 102.

The software rewriting section 117 rewrites the software, which is stored in the rewritable non-volatile memory 101 and is directly executed, with the update software, which is stored in the rewritable volatile memory 102 as the update file, after the update file is received by the update file reception section 116 from the software management server 200, and is stored in the rewritable volatile memory 102.

The rewrite success judgment section 118 judges success of the processing in which the software rewriting section 117 rewrites the software, which is stored in the rewritable non-volatile memory 101 and is directly executed, with the update software which is stored in the rewritable volatile memory 102 as the update file.

The restoration status transition section 119 enables connection of the communication terminal 100 and the software restoration apparatus 300 via the wire communication device 104, when the rewrite success judgment section 118 judges that the rewrite of the software, executed by the software rewriting section 117, failed.

The restoration software reception section 120 receives software from the software restoration apparatus 300 via the wire communication device 104 when the restoration status transition section 119 enabled connection of the software restoration apparatus 300 and the wire communication device 104 of the communication terminal 100. The restoration software reception section 120 stores the received software in the rewritable non-volatile memory 101, and restores the software of the rewritable non-volatile memory 101.

The software management server 200 according to the present embodiment will be described below. The software management server 200 according to the present embodiment is a computer system for managing update software to be stored in the rewritable non-volatile memory 101 of the communication terminal 100. The software management server 200 physically comprises a CPU (Central Processing Unit) 201, memory 202, hard disk 203, communication device 204, display device 205, and such an input device 206 as a keyboard and mouse, as shown in FIG. 1. Among the physical components of the software management server 200, the communication device 204 will be described below. The communication device 204 is a component for communicating with the communication terminal 100. Specifically, the communication device 204 is used for receiving the above identification information which is transmitted from the communication terminal 100, or transmitting the update file to the communication terminal 100. The communication line connected with the communication device 204 may be radio, or cable, such as a telephone line.

The functional components of the software management server 200 according to the present embodiment will be described below. The software management server 200 according to the present embodiment comprises an identification information reception section 211, an update software storage section 212, a differential file creation section 213, an update file information transmission section 214, a transfer request reception section 215, and an update file transmission section 216, as functional components. These components are configured as software to be loaded into the memory 202 of the software management server 200, for example, and are implemented by the CPU 201 accessing the update software storage section 212 disposed on the hard disk 203, and controlling the communication device 205 according to the software. The functional components of the software management server 200 will now be described in detail.

The identification information reception section 211 receives the above mentioned identification information, which is transmitted by the identification information transmission section 112 of the communication terminal 100 via the communication device 204. The identification information reception section 211 outputs the received identification information to the differential file creation section 213.

The update software storage section 212 is constructed in the hard disk 203 of the software management server 200, stores the update software of the target communication terminal associating the terminal ID and version information of the software. Specifically, the update software storage section 212 stores the update software to be stored in the rewritable non-volatile memory 101 of the communication terminal and the file capacity thereof in association with the terminal ID of the communication terminal and version information of the update software, as shown in FIG. 3.

The differential file creation section 213 creates a differential file between the update software to be stored in the rewritable non-volatile memory 101 of the communication terminal 100 which is stored in the update software storage section 212 and the software which is currently operating in the rewritable non-volatile memory 101 of the communication terminal 100, on the basis of the terminal ID and the version information of the software, which is stored in the rewritable non-volatile memory 101 and is directly executed, of the communication terminal 100, included in the identification information which is output by the identification information reception section 211. Specifically, when the terminal ID of the communication terminal 100 included in the identification information is "0001", and the version number of the software which is currently operating in the rewritable non-volatile memory 101 of the communication terminal 100 is "1", the new update software stored in the update software storage section 212 has the latest version "2", and the differential file of versions "1" and "2" of the update software is produced. The differential file creation section 213 outputs the created differential file to the update file transmission section 216 as an update file, and outputs update file information which includes the information notifying that an update file exists and the size information of the differential file to the update file information transmission section 214. In the present embodiment, although the differential file is produced, the update software with version "2" may be output to the update file transmission section 216 as the update file, and the update file information including "150 bytes" which is the size of the update software with version "2" as the size information, may be output to the update file information transmission section 214, if the band of the communication line of the software management system is wide enough to transfer a large sized file and the rewritable volatile memory 102 of the communication terminal has a capacity sufficient for storing the update software, even if a differential file is not created. On the other hand, if the terminal ID of the communication terminal 100 included in the identification information is "0001", and if there is no update software with a newer version, as in the case of when the version number of the software currently operating in the rewritable non-volatile memory 101 of the communication terminal 100 is "2", then the update file information including notification that the update software does not exist is output to the update file information transmission section 214.

The update file information transmission section 214 transmits the update file information received from the differential file creation section 213 to the communication terminal 100 via the communication device 204.

The transfer request reception section 215 receives a request of transmitting the update file, which is transmitted by the transfer request transmission section 115 of the communication terminal 100, via the communication device 204.

The update file transmission section 216 transmits the update file to the communication terminal 100 via the communication device 204 on the basis of the above mentioned request received by the transfer request reception section 215.

The software restoration apparatus 300 according to the present embodiment will be described below. The software restoration apparatus 300 according to the present embodiment is a dedicated apparatus for restoring software by wire communication with the communication terminal 100 when the processing of rewriting the software of the rewritable non-volatile memory 101 of the communication terminal 100 failed. As shown in FIG. 1, the software restoration apparatus 300 physically comprises a CPU (Central Processing Unit) 301, a memory 302, a hard disk 303, a wire communication device 304, a display device 305, and such an input device 306 as a keyboard and mouse. Out of the physical components of the software restoration apparatus 300, the wire communication device 304 will now be described.

The wire communication device 304 is a component for performing communication by connecting the communication terminal 100 with a cable. Specifically, the cable connection device 304 is used for transmitting software to the communication terminal 100, and restoring the software in the rewritable non-volatile memory 101 of the communication terminal 100, or for acquiring identification information of the communication terminal 100 from the communication terminal 100.

The functional components of the software restoration apparatus 300 according to the present embodiment will be described below. As shown in FIG. 2, the software restoration apparatus 300 according to the present embodiment comprises an identification information acquisition section 311, a restoration software storage section 312, a restoration software selection section 313, and a restoration software transfer section 314 as functional components. These components are configured as software to be loaded into the memory 302 of the software restoration apparatus 300, for example, and is implemented by the CPU 301 accessing the restore software storage section 314 which is disposed on the hard disk 303, or controlling the wire communication device 304. The functional components of the software restoration apparatus 300 will be described in detail below.

The identification information acquisition section 311 acquires the identification information of the communication terminal 100 by connecting with the wire communication device 104 of the communication terminal 100 via the wire communication device 304.

The restoration software storage section 312 stores software in a similar format as the update software storage section 212 of the software management server 200, shown in FIG. 3. The restoration software storage section 312 is constructed in the hard disk 303 of the software restoration apparatus 300.

The restoration software selection section 313 selects software to be transferred to the rewritable non-volatile memory 101 of the communication terminal 100 for restoration, from the restoration software storage section 312 on the basis of the identification information of the communication terminal 100 acquired by the identification information acquisition section 311.

The restoration software transmission section 314 transmits the software selected by the restoration software selection section 313 to the communication terminal 100 via the wire communication device 304.

Figure 4:
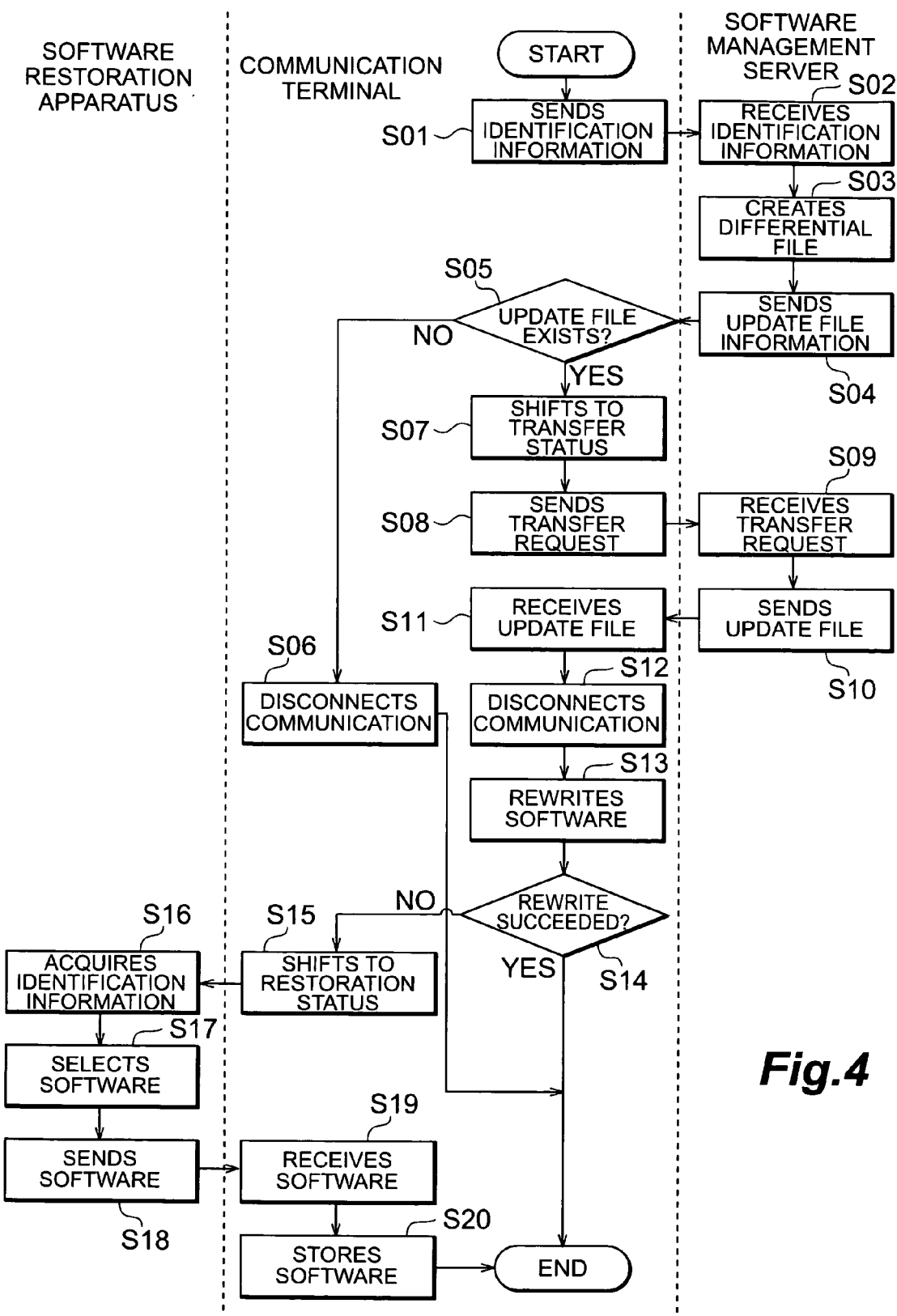
FIG. 4 is a flow chart depicting the software update method by the software update system according to an embodiment of the present invention.

Operation of the software update system according to an embodiment of the present invention will be described, and also the update method of software in the software update system according to the present embodiment will be described. FIG. 4 is a flow chart depicting the update method of software according to the present embodiment.

The identification information transmission section 112 of the communication terminal 100 transmits the identification information to the software management server 200 (step S01). The identification information reception section 211 of the software management server 200 receives the identification information transmitted by the identification information transmission section 112 (step S02), and outputs it to the differential file creation section 213. On the basis of the terminal ID of the communication terminal 100 and version information of the software included in the identification information, the differential file creation section 213 creates the differential file between an update software and the software which is stored in the rewritable non-volatile memory 101 of the communication terminal 100 and is directly executed, if there is the update software to be transmitted from the update software storage section 212 to the communication terminal 100 (step S03), and outputs this differential file to the update file transmission section 216 as an update file. The differential file creation section 213 also outputs update file information which includes information to notify that the update file exists and the size information of this update file to the update file information transmission section 214. If an update file does not exist, on the other hand, the differential file creation section 213 outputs the update file information which notifies that an update file does not exist, to the update file information transmission section 214. As mentioned above, if the band of the communication line of the software management system is wide enough to transfer a large sized file, and if the rewritable volatile memory 102 of the communication terminal has a capacity sufficient for storing the update software, even if a differential file is not created, then the update software can be transmitted, as is, as an update file.

Then the update file information transmission section 214 transmits the update file information received from the differential file creation section 213 to the communication terminal 100 (step S04). The update file information reception section 113 of the communication terminal 100 receives the update file information transmitted by the update file information transmission section 214, and judges whether an update file exists (step S05). If an update files does not exist, the update file information reception section 113 disconnects communication between the communication terminal 100 and the software management server 200 (step S06), and ends software update processing. If an update file exists, on the other hand, the transfer status transition section 114 secures an area required for transferring the update file by limiting operation of software which uses the rewritable volatile memory 102 of the communication terminal 100 on the basis of the size information included in the update file information, thereby enabling transfer of the update file (step S07). After the status shifts to a status in which the update file can be transferred, by the transfer status transition section 114, the transfer request transmission section 115 transmits a request of transmitting the update file to the software management server 200 (step S08). The transfer request reception section 215 of the software management server 200 receives the request transmitted from the transfer request transmission section 115 (step S09), and on the basis of this request, the update file transmission section 216 transmits the update file to the communication terminal 100 (step S10). The update file reception section 116 of the communication terminal 100 receives the update file transmitted by the update file transmission section 216 of the software management server 200, and stores it in the rewritable volatile memory 102 (step S11) When storing the update file in the rewritable volatile memory 102 by the update file reception section 116 completes, communication between the communication terminal 100 and the software management server 200 is disconnected (step S12).

Then the software rewriting section 117 rewrites the software, which is stored in the rewritable non-volatile memory 101 and is directly executed, with the update software which is stored in the rewritable volatile memory 102 as the update file (step S13). The rewrite success judgment section 118 judges whether rewriting of the software by the software rewriting section 117 succeeded (step S14), and if rewriting succeeded, the rewrite success judgment section 118 ends the software update processing.

If the rewrite success judgment section 118 judges that the update of software by the software rewriting section 117 failed, on the other hand, the restoration status transition section 119 enables connection of the communication terminal 100 and the software restoration apparatus 300 via the wire communication device 104 of the communication terminal 100 and the wire communication device 304 of the software restoration apparatus 300 (step S15).

When the communication terminal 100 and the software restoration apparatus 300 are connected via a cable in order to restore the communication terminal 100 which operation is disabled due to a failure of update of the software, the identification information acquisition section 311 of the software restoration apparatus 300 acquires the identification information of the communication terminal 100 from the identification information storage section 111 of the communication terminal 100 (step S16). on the basis of the identification information acquired by the identification information acquisition section 311, the restoration software selection section 313 selects the software to be transferred to the rewritable non-volatile memory 101 of the communication terminal 100 from the restoration software storage section 312 (step S17). The restoration software transmission section 314 transmits the software selected by the restoration software selection section 313 via the wire communication device 304 (step S18). The restoration software reception section 120 of the communication terminal 100 receives the software transmitted by the restoration software transmission section 314 (step S19), and stores this software in the rewritable non-volatile memory 101, and the software, which is stored in the rewritable non-volatile memory 101 and is directly executed, is thus restored (step S20).

The action and effects of the software update system according to an embodiment of the present invention will now be described.

After the update file is transferred from the software management server 200 to the rewritable volatile memory 102, the software, which is stored in the rewritable non-volatile memory 101 and is directly executed, is rewritten with the update software which is stored in the rewritable volatile memory 102 as an update file. Therefore it is necessary that the rewritable non-volatile memory is duplicated for updating the software. As a result, the communication terminal 100 can be downsized and cost can be decreased. Also transfer of an update file which tends to take time and have such a risk factor as power disconnection, and rewriting of software which takes shorter time than above can be separated, so the risk of failing to update software can be decreased. Also even if transfer is interrupted in the middle of transferring an update file, the software, which is stored in the rewritable non-volatile memory 101 of the communication terminal 100 and is directly executed, has not been updated, so operation of the communication terminal 100 is not affected.

The update is stored in the area of the rewritable volatile memory 102, which is secured by limiting the operation of the software which uses the rewritable volatile memory 102 in the normal operating status of the communication terminal 100 before an update file is transferred. Therefore even if the capacity of the rewritable volatile memory 102 is small, the update file can be transferred to the rewritable volatile memory 102 without increasing the rewritable volatile memory 102.

Also the area for storing the update file is secured in the rewritable volatile memory 102 on the basis of the size information of the update file included in the update file information. Therefore an appropriate size of the area for storing the update file can be secured in the rewritable volatile memory 102.

Also the communication terminal 100 transmits the identification information of the software, which is stored in the rewritable non-volatile memory 101 and is directly executed, and the identification information of the communication terminal 100 to the software management server 200. Therefore the software management server 200, which receives this identification information, can specify the model of the communication terminal 100 on the basis of the identification information of the communication terminal 100, and can specify the version of the software which is currently operating in the rewritable non-volatile memory 101 of the communication terminal 100. As a result, out of items of the update software owned by the software management server 200, the update software to be stored in the rewritable non-volatile memory 101 of the communication terminal 100 can be accurately selected. Also the software management server 200 produces a differential file between the software, which is stored in the rewritable non-volatile memory of the communication terminal 100 and is directly executed, and the update software owned by the software management server 200, on the basis of the identification information of the software, which is stored in the rewritable non-volatile memory 101 and is directly executed, and transmits this differential file as an update file. Therefore the size of the update file to be transmitted can be decreased. As a result, the update file can be accurately transmitted even via a narrowband communication line.

Since the present invention has the above mentioned functions, the update software can be efficiently transferred even via a narrowband communication line, such as a radio communication line. Also even if it takes time to transfer an update file, this does not become a cause of failing to update software, therefore the risk of failing to update software is low. As a consequence, the rewritable non-volatile memory of the communication terminal 100 need not be duplicated for updating software.

Also even if rewriting of software failed due to a power failure, for example, which occurred in the middle of the processing of rewriting the software, which is stored in the rewritable non-volatile memory 101 and is directly executed, with the update software, wire communication with the software restoration apparatus 300 for restoring the software, which is stored in the rewritable non-volatile memory 101 and is directly executed, is enabled by the restoration status transition means 120. Therefore, if the communication terminal 100 and the software restoration apparatus 300 are connected, software can be restored in the rewritable non-volatile memory 101 by the software restoration apparatus 300.

INDUSTRIAL APPLICABILITY

This invention can be applied to the update method of software for the communication terminal, a communication terminal, and a software update system for updating software of a communication terminal.

The invention claimed is:

1. A communication terminal including a rewritable non-volatile memory and a rewritable volatile memory, the communication terminal comprising:
    means for limiting operation of software using the rewritable volatile memory in response to a received update file information and securing, in response to the received update file information, an area required for storing the update file in the rewritable volatile memory before receiving the update file from a software management server, the volatile memory being used by the software during normal operation;
    means for requesting transfer of the update file to the software management server after the area required for storing the update file in the rewritable volatile memory is secured;
    means for receiving the update file from the software management server, and storing the update file in the rewritable volatile memory; and
    means for rewriting software stored in the rewritable non-volatile memory that is directly executed, with the update file stored in the rewritable volatile memory.

2. The communication terminal according to claim 1, wherein the means for receiving stores the update file in the area of the rewritable volatile memory, secured by limiting the operation of software which uses the rewritable volatile memory.

3. The communication terminal according to claim 1, further comprising:
    means for receiving the update file information, including size information of the update file, from the software management server,
    wherein the means for limiting secures the area for storing the update file in the rewritable volatile memory on the basis of the size information included in the update file information.

4. The communication terminal according to claim 1, further comprising:
    means for storing identification information of the communication terminal; and
    means for transmitting the stored identification information of the communication terminal to the software management server.

5. The communication terminal according to claim 1, further comprising:
    means for storing identification information of the software stored in the rewritable non-volatile memory; and
    means for transmitting the identification information of the stored software to the software management server.

6. The communication terminal according to claim 5, wherein the means for receiving receives a differential file, transmitted from the software management server on the basis of the identification information of the software.

7. The communication terminal according to claim 1, wherein the means for receiving receives the update file by wireless communication.

8. The communication terminal according to claim 1, further comprising:
    means for judging whether a rewrite of the software is successful;
    means for performing wire communication with a software restoration apparatus for restoring the software by transferring the software to the rewritable non-volatile memory, when the means for judging judges that the rewrite of the software fails; and
    means for receiving the software from the software restoration apparatus and storing the software in the rewritable non-volatile memory.

9. A computer-readable medium storing computer readable instructions thereon, the computer-readable instructions when executed by a processor of a communication terminal cause the processor to perform the steps comprising:
    limiting operation of software using the rewritable volatile memory in response to a received update software information, the rewritable volatile memory being used by the software during normal operation;
    securing, in response to the received update file information, an area required for storing an update file in the rewritable volatile memory before receiving the update file from a software management server;
    requesting transfer of the update file from the software management server after the area required for storing the update file is secured in the rewritable volatile memory;
    receiving, upon a transfer request by the communication terminal, the update file;
    storing the update file in the secured area of rewritable volatile memory; and
    rewriting a software, stored in the rewritable non-volatile memory, with the update file stored in the rewritable volatile memory.

10. A software update system comprising:

a communication terminal including means for limiting, in response to a received update file information, operation of software using a rewritable volatile memory and securing, in response to the received update file information, an area required for storing an update file in the rewritable volatile memory before receiving the update file from a software management server, the rewritable volatile memory being used by the software during normal operation;

means for requesting transfer of the update file from the software management server after securing the area required for storing the update file in the rewritable volatile memory;

means for receiving the update file from the software management server, and storing the update file in the rewritable volatile memory; and means for rewriting software, stored in a rewritable non-volatile memory, with the update file stored in the rewritable volatile memory, after completion of storing the update file to the rewritable volatile memory by the update file reception means, and the software management server including means for transmitting the update file to the communication terminal upon a transfer request by the communication terminal.

11. The software update system according to claim 10, wherein the communication terminal further includes means for storing identification information of the software stored in the rewritable non-volatile memory, and means for transmitting the identification information of the stored software, to the software management server; and the software management server further includes means for producing a differential file of the update software of the software, on the basis of the identification information of the software transmitted from the communication terminal, means for transmitting the differential file to the communication terminal, and means for receiving the differential file transmitted by the software management server.

12. The software update system according to claim 10, further comprising:

a software restoration apparatus configured to connect to the communication terminal via wire communication and configured to transfer a software to the rewritable non-volatile memory of the communication terminal, restoring the software in the rewritable non-volatile memory, wherein the communication terminal further includes means for judging whether a rewrite of the software succeeds;

means for performing wire communication with the software restoration apparatus for restoring the software, by transferring the software to the rewritable non-volatile memory when the rewrite of the software fails; and means for receiving the software from the software restoration apparatus and storing the software in the rewritable non-volatile memory.

\* \* \* \* \*